United States Patent
Schultze et al.

(10) Patent No.: US 9,841,738 B2
(45) Date of Patent: Dec. 12, 2017

(54) FIELD BUS DEVICE WITH THE POSSIBILITY FOR INPUTTING ENERGY DATA

(71) Applicant: Robert Bosch GmbH, Stuttgart (DE)

(72) Inventors: Stephan Schultze, Lohr-Wombach (DE); Henning Osterfeld, Lohr-Sendelbach (DE)

(73) Assignee: Robert Bosch GmbH, Stuttgart (DE)

( * ) Notice: Subject to any disclaimer, the term of this patent is extended or adjusted under 35 U.S.C. 154(b) by 830 days.

(21) Appl. No.: 14/276,670

(22) Filed: May 13, 2014

(65) Prior Publication Data
US 2014/0343746 A1    Nov. 20, 2014

(30) Foreign Application Priority Data

May 15, 2013  (DE) .................. 10 2013 208 963

(51) Int. Cl.
  *G05B 15/02*    (2006.01)
(52) U.S. Cl.
  CPC .... *G05B 15/02* (2013.01); *G05B 2219/34306* (2013.01); *G05B 2219/39407* (2013.01); *Y02P 70/163* (2015.11)
(58) Field of Classification Search
  None
  See application file for complete search history.

(56) References Cited

U.S. PATENT DOCUMENTS

| | | | | |
|---|---|---|---|---|
| 6,851,067 B2 * | 2/2005 | Indefrey | ................ | H04L 12/12 713/320 |
| 7,058,542 B2 * | 6/2006 | Hauhia | .............. | G05B 19/0428 702/182 |
| 7,124,239 B2 * | 10/2006 | Saito | ................. | G05B 19/0426 700/75 |
| 8,127,060 B2 * | 2/2012 | Doll | ..................... | G05B 19/042 700/86 |
| 8,217,782 B2 * | 7/2012 | Nelson | ................ | G05B 19/042 340/10.33 |
| 8,281,174 B2 * | 10/2012 | Seiler | ................ | G05B 19/4185 340/539.3 |

(Continued)

FOREIGN PATENT DOCUMENTS

DE  10 2011 108 964 A1   1/2013
EP    2 192 457 A1    6/2010

OTHER PUBLICATIONS

Eberle "Adaptive Internet Integration of Field Bus Systems", 2007 IEEE, pp. 12-20.*

(Continued)

*Primary Examiner* — Van Nguyen
(74) *Attorney, Agent, or Firm* — Maginot, Moore & Beck LLP

(57) ABSTRACT

A method for operating an automation machine having a field bus device and an energy consumer connected to the field bus device, includes storing energy data relating to the energy consumer in the field bus device before operation of the automation machine, the energy data identifying an energy mode being stored, reading the energy data from the field bus device by a first control device connected to the field bus device via a field bus, and using the energy data for energy-saving operation of the automation machine during operation of the automation machine.

3 Claims, 1 Drawing Sheet

(56) References Cited

U.S. PATENT DOCUMENTS

| | | | |
|---|---|---|---|
| 8,362,655 B2* | 1/2013 | Landgraf | G05B 19/0428 |
| | | | 307/116 |
| 8,738,190 B2* | 5/2014 | Pai | G05B 15/02 |
| | | | 700/286 |
| 2005/0137719 A1* | 6/2005 | Saito | G05B 19/0426 |
| | | | 700/5 |
| 2010/0168897 A1* | 7/2010 | August | G05B 19/042 |
| | | | 700/105 |
| 2010/0222895 A1* | 9/2010 | Seiler | G05B 19/4185 |
| | | | 700/16 |
| 2011/0172838 A1 | 7/2011 | Pai et al. | |
| 2012/0330478 A1* | 12/2012 | Malsch | G05B 19/4185 |
| | | | 700/297 |
| 2015/0039099 A1* | 2/2015 | Mizutani | G05B 19/05 |
| | | | 700/3 |

OTHER PUBLICATIONS

Pleinevaux "Time Critical Communication Networks: Field Bus Systems", 1998 IEEE, pp. 55-63.*
SIEMENS AG; Saving Energy with SIMATIC S7; PROFIenergy with ET200S; Nov. 2011; 71 Pages.

* cited by examiner

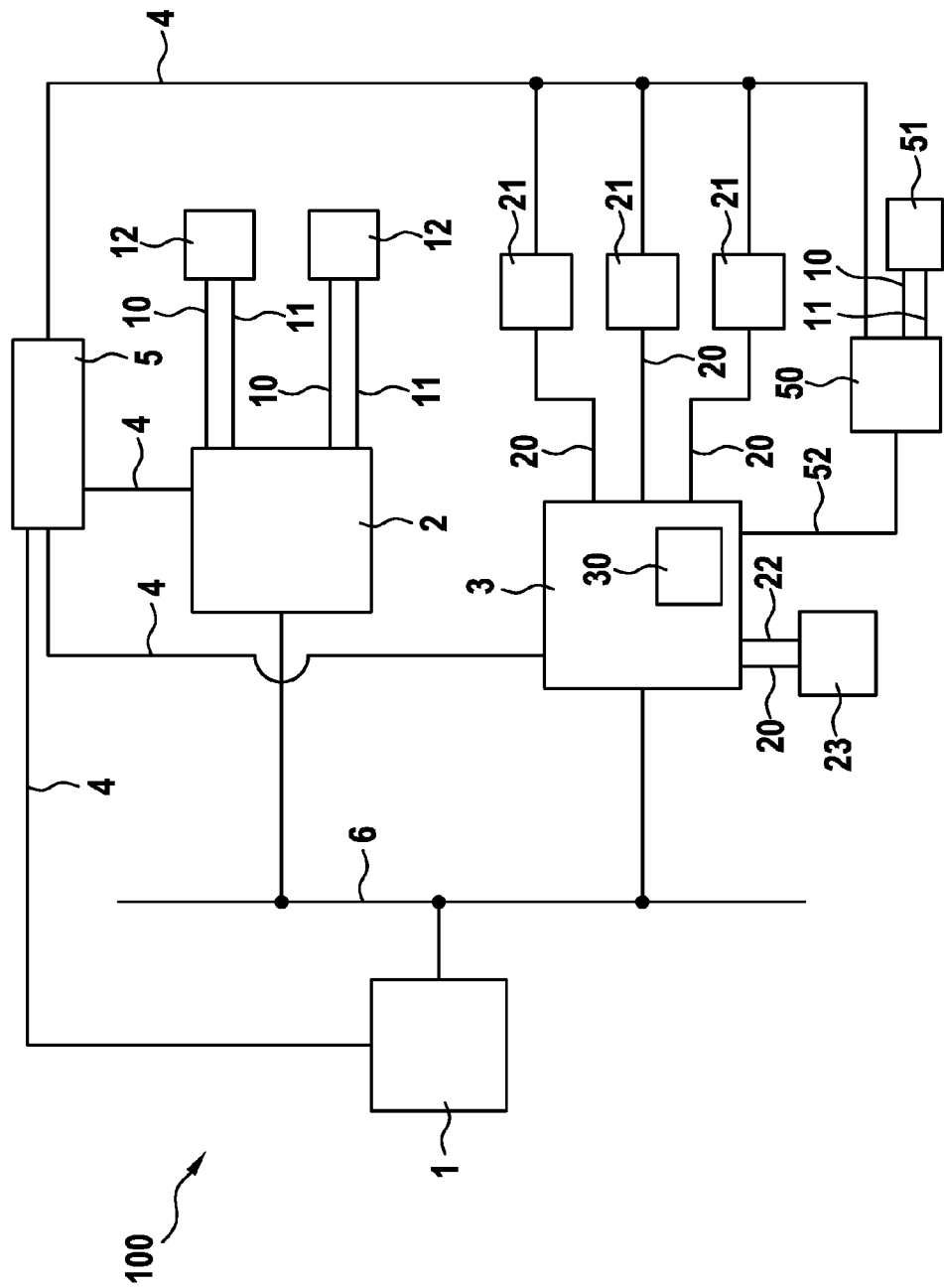

FIELD BUS DEVICE WITH THE POSSIBILITY FOR INPUTTING ENERGY DATA

This application claims priority under 35 U.S.C. §119 to patent application no. DE 10 2013 208 963.5, filed on May 15, 2013 in Germany, the disclosure of which is incorporated herein by reference in its entirety.

The present disclosure relates to a method for operating an automation machine having a field bus device and an energy consumer connected to the field bus device.

BACKGROUND

Automation machines, for example machine tools, processing machines, printing machines, handling machines, transport machines etc., are machines which have a modular structure and whose function and sequences are predefined by one or more control devices (so-called controllers, for example PLCs, MotionControl), the control devices controlling electrical energy consumers, such as actuators and sensors themselves, as well as the components driven by the actuators, such as motors, power supply units, drives, heating systems, cooling systems and many more. The control devices and sometimes also the energy consumers are connected via field bus networks, such as ProfiNet or SERCOS, as communication systems. They are therefore so-called field bus devices.

As part of the general trend for saving energy, efforts are also being made in automation machines to make operation as energy-saving as possible. One aspect in this case is the use of so-called energy modes ("EM", also referred to as an energy-saving state). The energy consumption of automation machines having at least one energy consumer which consumes a different amount of energy in different operating modes can be optimized using energy management. Examples thereof are fans whose speed can be controlled and which are switched off in operating pauses, servo drives whose power supply is switched off during a standstill, or heating systems which are operated at a lower desired temperature value in operating pauses. For this purpose, one or more operating modes are assigned to different energy modes. In field bus devices, there are so-called energy profiles, that is to say agreements relating to specified data and their formats, for energy management. "Sercos Energy" or "PROFIEnergy" are mentioned here as examples. In this case, a plurality of additional intermediate modes are usually defined between the two limit modes "EM Power Off" (devices deenergized) and "EM Operational" (devices ready for operation). Energy modes are characterized by a large number of characteristic variables (also referred to as energy data here). These are, for example, the energy consumption in the respective mode, power consumption, time needed to transition between the modes, energy requirement during the transition process, minimum/maximum residence times in different energy modes.

In order to be able to achieve operation of the energy consumers which is as energy-saving as possible, the control device controlling the energy consumption must know the different energy modes or at least the energy data relating to the electrical energy consumers. If the energy consumers are directly supplied with energy by the control device, the control device can measure different electrical variables such as, in particular, maximum/minimum/average voltage, current, power, frequency etc. during operation as energy data and can use them to define energy modes. Energy consumers may also be connected to the control device via the field bus and can communicate the relevant data to the control device via said field bus.

Conversely, however, the control device cannot optimize the energy consumption of an energy consumer if it does not know the energy modes or energy data relating to the electrical energy consumers, for example because the data are not stored in the energy consumer or are stored in a form which cannot be used further (for example because a "simple" energy consumer itself does not have its own control unit or because the energy consumer is connected via a subordinate bus or sub-bus with different energy specifications), and the energy consumer is not supplied with energy via the control device and/or if the connection between the energy consumer and the control device is not suitable for transmitting the data. This is the case, in particular, with energy consumers connected to so-called I/O modules. Energy consumers are connected to I/O modules via analog (that is to say with a signal level which is variable over a range, for example 0 . . . 24 V) or digital (that is to say with (for example two) discrete signal levels, for example TTL) inputs and outputs and/or their own sub-buses, for example IO link, CAN bus or RS232/422/485.

It is therefore desirable to be able to optimize the energy consumption for such configurations as well.

SUMMARY

The disclosure proposes a method for operating an automation machine having a field bus device and an energy consumer connected to the field bus device having the features described herein.

The disclosure uses the measure of storing energy data relating to an energy consumer which identify an energy mode in a field bus device, in particular a control device. As a result, the field bus device has the information required for energy-saving operation even in the above situations. The field bus device expediently has a rewritable storage device in which the energy data are stored. In order to input the energy data, a computer program is expediently provided which, when executed on a computer, displays a user interface to the user, in which interface the relevant energy data are input. The energy data are stored in the field bus device in such a manner that they can be read by an energy management entity (usually on a superordinate control device which is connected to the field bus device via the field bus).

As an alternative to manual input, the energy data may also be automatically read from the energy consumer if the latter is connected to the field bus device via a sub-bus different from the field bus. In the latter case, the energy data are read from the field bus device via the sub-bus, are converted into the energy profile of the field bus and are stored.

The field bus device is preferably set up to assign the energy data relating to the at least one connected energy consumer to at least two different energy modes automatically or in accordance with a user input. For example, a field bus device can automatically form new energy modes from all permutations of the energy modes of the connected energy consumers. This is practical, in particular, when only a few energy consumers (for example at most four) are connected to the field bus device and these energy consumers each have only a few energy modes (for example a binary connection produces two energy modes). A total of $2^4=16$ energy modes then result and can be automatically combined. Alternatively, new energy modes can be formed in accordance with the energy consumer having the greatest number of its own energy modes. The energy modes can then be transmitted, in particular, to the energy management entity and can be used there to operate the energy consumer.

The energy data to be input are preferably those electrical variables which could also be measured by a field bus device. Energy modes can be defined using different energy data which can be measured, as described, for example, in Common Application Profile PROFIenergy; Technical Specification for PROFINET; Version 1.0; January 2010; Table 10-1, or in "Energie sparen mit SIMATIC S7" [Save energy with SIMATIC S7]; PROFIenergy with ET200S; application description, November 2011.

The disclosure makes it possible for energy consumers without their own readable or measurable energy data, which are connected to field bus devices, to be handled by the energy management entity during operation of the automation machine as if they had energy data. In this case, the energy data are expediently input by the commissioning engineer and are stored in the field bus device when starting up the machine (subsequent inputs may but need not be possible). Energy data usually cannot be written, with the result that a possibility for at least temporarily canceling the write protection is implemented in the field bus device within the scope of the disclosure. These energy data can then be used further, just like energy data read or measured from the field bus device.

Configuration can be effected using a computer-implemented configuration interface. The configuration interface can be integrated in the engineering environment of the higher-level automation system. This makes it possible to achieve so-called consistency of the configuration. Such integration is advantageously achieved using standardized software interfaces, for example FDT/DTM mechanisms or TCI mechanisms. In this case, the configuration interface need not be adapted to each engineering environment.

A data back-up/data restore method is preferably provided. In this case, the energy data stored in the field bus device can be read or written, for example by a superordinate control device, in order to be able, for example in the event of the field bus device being exchanged, to write the data to the exchanged field bus device again in an automated manner. As already mentioned, the at least temporary canceling of write protection may be necessary for this purpose. Alternatively, a restore process can also be carried out by virtue of the energy data to be configured being mapped using one or more further field bus objects or field bus parameters which do not have any write protection (for example a field bus object with a byte stream whose contents do not have to be able to be evaluated but rather only have to be able to be read and written by the higher-level automation system). In an exemplary implementation of this function in sercos Energy, the energy data would be present in the field bus device there in individual parameters (field bus objects) and would be set once (that is to say can be temporarily written) by a user in accordance with the connected energy consumers. The parameters would then be changed to "not writable" and the data contents of a plurality of parameters would be represented in a further writable parameter. This further parameter may have any desired format which cannot be interpreted by the controller, but the parameter contents can be read and written by the controller.

A back-up/restore function can be achieved as a result of this further parameter being able to be read and written. After a writing process, the data which have been written appear in the data of the plurality of individual parameters with the energy data.

If there are a plurality of energy consumers connected to the field bus device, at least one energy consumer group energy mode is preferably defined and is used as a type of intersection of the energy modes of the plurality of energy consumers. Each energy consumer usually supports individual energy modes. In order to now be able to predefine a comprehensive energy mode for a plurality of energy consumers, at least one energy consumer group energy mode is defined for all energy consumers connected to the field bus device automatically or in accordance with a user input. The field bus device first of all expediently forms new virtual group energy modes from the different energy modes of a plurality of or all connected energy consumers ("energy mode EV i"). In this case, each virtual group energy mode is composed of one energy mode of all energy consumers, as illustrated in the following table, for example. In this case, provision may also be made for a group energy mode to also not be provided for all possible combinations of energy consumer energy modes. The energy consumers may also include those with readable energy data.

Example Table:

|  | Group energy mode | | |
| --- | --- | --- | --- |
|  | 1 | 2 ... | n |
| Energy mode EV 1 | 1 | 2 | n − 1 |
| Energy mode EV 2 | 1 | 1 | n + 1 |
| ... | | ... | |
| Energy mode EV n | 1 | 2 | n − 5 |

With respect to further details, reference is made to the post-published DE 10 2012 025 228.5, the disclosure of which is included here.

The field bus device according to the disclosure is set up, in particular in terms of programming, to carry out a method according to the disclosure.

Implementation of the disclosure in the form of software is also advantageous since this enables particularly low costs, in particular if an executing computing unit is also used for other tasks and is therefore present anyway. Suitable data storage media for providing the computer program are, in particular, floppy disks, hard disks, flash memories, EEPROMs, CD-ROMs, DVDs and many more. It is also possible to download a program using computer networks (Internet, intranet etc.).

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

The disclosure is schematically illustrated in the drawing using an exemplary embodiment and is described in detail below with reference to the drawing.

BRIEF DESCRIPTION OF THE DRAWINGS

The FIGURE schematically shows a field bus network having a plurality of control devices and energy consumers, which network can be operated according to the disclosure.

DETAILED DESCRIPTION

The FIGURE schematically illustrates a field bus network 100 which makes it possible for components of an automation machine to communicate. The automation machine has a number of energy consumers 12, 21, 23 and 51, for example motors, heating systems etc., which are controlled by a number of control devices 1, 2 and 3. For the energy supply, there is an energy supply device 5 to which individual components are connected via supply lines 4.

The control device 1 is a superordinate control device to which subordinate control devices 2, 3 are connected via a field bus 6, for example according to a ProfiNet or Sercos standard. The control devices 1, 2 and 3 are therefore field bus devices.

The superordinate control device 1 is set up to control the energy consumers 12, 21 and 23 via the subordinate control devices 2 and 3 in such a manner that the energy consumption of the automation machine is as low as possible. In this case, energy data which can be read or interrogated from the subordinate control devices 2 and 3 by the superordinate control device 1 are taken into account.

The energy consumers 12 are controlled by the subordinate control device 2 via a control line 10 and are supplied with energy via an energy supply line 11. It goes without saying that refinements are also possible in which a control line is simultaneously an energy supply line if the action of the energy consumer depends on the energy supplied (for example in the case of an electric motor, a magnetic actuator, a heating system etc.). The subordinate control device 2 is set up to measure the energy data during operation of the energy consumers 12 and to provide the superordinate control device 1 with said data.

The energy consumers 21 are controlled by the subordinate control device 3 via a control line 20 and are separately supplied with energy via an energy supply line 4. The control line 20 can enable, for example, binary coupling in which the energy consumer has discrete operating states. A heating system which can only be switched on and off (1 bit) or whose heat output can be predefined in a few stages (for example 3 stages=2 bits) is mentioned here as an example.

The control line 20 may also enable, for example, analog coupling in which the energy consumer has a substantially continuous range of operating states. An energy consumer having a valve whose opening cross section can be adjusted using an analog signal of 0 . . . 24 V is mentioned here as an example. Since control from the field bus side is usually discrete or digital, that is to say there is a discrete operating specification with a number of possible steps (resolution) in the field bus network, only energy consumptions or energy modes corresponding to the discrete operating specifications are also defined in the case of analog coupling in the control device 3.

The control line 20 may also be, for example, a sub-bus or sub-bus in which the operation of the energy consumer is controlled using bus commands. These may be, in particular, serial sub-buses, for example IO link, CAN bus or RS232/422/485.

The energy consumer 23 is controlled by the subordinate control device 3 via a control line 20 and is supplied with energy via an energy supply line 22.

The subordinate control device 3 now contains a digital memory 30 which stores energy data for the consumers 21. These are preferably the energy data which are mapped in an analogous manner for the consumers 12 and 23 by the associated control device 2 and 3. Said energy data are stored in the digital memory 30, in particular when starting up the automation machine, and are made available to the superordinate control device 1 during operation. The control device 3 is set up to at least temporarily allow energy data to be stored. This is because the energy data which are specified as read only in the energy profiles specified nowadays must be able to be changed during the configuration process. This may be effected, for example, by temporarily canceling the write protection. After the configuration process has ended, the energy data are then presented with the write protection properties specified in the energy profiles and therefore provide the greatest possible conformity with the energy profile.

A control device 50 which is more subordinate is also connected to the subordinate control device 3 via a subordinate bus or sub-bus 52. The energy consumer 51 is controlled by the control device 5 which is more subordinate via a control line 10 and is supplied with energy via an energy supply line 11. The control device 5 which is more subordinate is set up to map the energy data relating to the energy consumer 51 during operation and to make said data available to the control device 3. The subordinate control device 3 is in turn set up to likewise store these energy data and to make them available to the superordinate control device 1 during operation.

All energy consumers 12, 21, 23, 51 can then be treated in the same manner by the superordinate control device 1 during energy management irrespective of whether said consumers are supplied with energy via the associated control device or directly.

The refinement in which an energy consumer itself is a field bus device and makes its energy data available to the superordinate control device 1 via the field bus is not illustrated in the FIGURE.

What is claimed is:

1. An automation machine comprising:
   a first energy consumer device;
   an energy supply device configured to provide energy to the first energy consumer device;
   a superordinate control device operatively connected to a plurality of subordinate control devices via a field bus; and
   a first subordinate control device in the plurality of subordinate control devices, the first subordinate control device being operatively connected to the first energy consumer device, the first subordinate control device comprising:
   a first input/output (I/O) device connected to the first subordinate control device;
   a field bus device configured to transmit and receive data from the superordinate control device, the field bus device being separate from the first I/O device;
   a memory configured to store first energy mode data corresponding to at least two operating modes of the first energy consumer device; and
   a controller operatively connected to the first I/O device, the field bus device, and the memory, the controller being configured to:
   transmit, with the field bus device, the first energy mode data to the superordinate control device;
   receive, with the field bus device, a first command from the superordinate device to operate the first energy consuming device in a first operating mode of the at least two operating modes; and
   transmit, with the first I/O device, another command to the first energy consuming device to operate the first energy consuming device in the first operating mode.

2. The automation device of claim 1 further comprising:
   a second energy consumer device;
   the energy supply device being configured to provide energy to the second energy consumer device;

a second subordinate control device in the plurality of subordinate control devices, the second subordinate control device being operatively connected to the second energy consumer device, the second subordinate control device comprising:
   a second input/output (I/O) device connected to the second subordinate control device;
   a field bus device configured to transmit and receive data from the superordinate control device, the field bus device being separate from the second I/O device;
   a memory configured to store second energy mode data corresponding to at least two operating modes of the second energy consumer device; and
   a controller operatively connected to the second I/O device, the field bus device, and the memory, the controller being configured to:
      transmit, with the field bus device, the second energy mode data to the superordinate control device;
      receive, with the field bus device, a second command from the superordinate device to operate the second energy consuming device in a second operating mode of the at least two operating modes; and
      transmit, with the second I/O device, another command to the second energy consuming device to operate the second energy consuming device in the second operating mode.

3. The automation device of claim 2 wherein the superordinate control device is configured to operate the automation machine with a predetermined energy consumption level via transmission of the first command to the first subordinate control device and transmission of the second command to the second subordinate control device to operate the first energy consuming device in the first operating mode and the second energy consuming device in the second operating mode.

* * * * *